US006546630B2

(12) United States Patent
Davison

(10) Patent No.: US 6,546,630 B2
(45) Date of Patent: Apr. 15, 2003

(54) MEASURER AND CUTTER FOR HOSE AND CORDAGE

(76) Inventor: Francis J. Davison, 704 5th. St., E. Northport, NY (US) 11731

( * ) Notice: Subject to any disclaimer, the term of this patent is extended or adjusted under 35 U.S.C. 154(b) by 138 days.

(21) Appl. No.: 09/782,545

(22) Filed: Feb. 13, 2001

(65) Prior Publication Data

US 2001/0032390 A1 Oct. 25, 2001

Related U.S. Application Data

(60) Provisional application No. 60/186,162, filed on Feb. 29, 2000.

(51) Int. Cl.[7] .............................................. B23D 21/06
(52) U.S. Cl. ............................... 30/92; 30/123; 83/369
(58) Field of Search ........................... 30/92, 123, 142, 30/241, 182; 83/76.8, 208, 369

(56) References Cited

U.S. PATENT DOCUMENTS 5,203,083 A 4/1993 Domonoske .................. 30/92
5,301,427 A * 4/1994 Swatek ...................... 30/92 X
5,890,291 A 4/1999 Crum ........................... 30/92

* cited by examiner

*Primary Examiner*—Douglas D. Watts

(57) ABSTRACT

A hand-held measuring and cutting device for pliable tubing, man-made or natural cordage, roping, etcetera. The device comprises a plurality of demountably conjointed and diametrically opposing rigid substrates that house or provide surfaces for insertion therein or attachment thereto, a plurality of elements including a conventional type linear measuring counter for measuring pliable material prior to being cut. A blade and blade plunger, handle, compressor member, and feed hole being so disposed, attached or inserted therein or thereto, provide for single-hand operation of the measuring and cutting operation of the device. The device safely shrouds the cutting blade, and provides for quick and easy disassembly of the unit to change the blade or to access other internal mechanisms. Easy access to the complete interior including the waste ejection port, blade recess and all moving parts makes maintenance simple. The device so incorporating a conventional counter and being so designed for single handed operation, provides a single, easy to use, time saving tool for use in the current process of measuring and cutting bulk supplied pliable materials.

4 Claims, 10 Drawing Sheets

MEASURER AND CUTTER FOR HOSE AND CORDAGE

BACKGROUND—CROSS-REFERENCE TO RELATED APPLICATION

This application claims the benefit of Provisional Patent Application Ser. #60/186,162, filed Feb. 29, 2000.

BACKGROUND—FIELD OF THE INVENTION

This invention relates to hand-held measuring and cutting devices, specifically to such devices used for measuring and cutting pliable tubing and cordage.

BACKGROUND—DESCRIPTION OF PRIOR ART

Rubber tubing and various pliable tubing and cordage, roping, etcetera, are typically supplied in long continuous lengths. A wide variety of professions and businesses utilize these bulk, continuous length materials, but measuring and cutting these materials to a pre-determined and useful length is cumbersome and time consuming.

Currently the only practical and affordable means to cut a long length of pliable material to the size required is by first measuring with a tape measure and then cutting with a straight razor or shears. This method, though utilitarian, is time consuming, awkward, and dangerous.

A number of inventions have addressed the safety issue of the cutting operation of this current practice such as U.S. Pat. No. 5,890,291 to Crum (1999). Crum's invention, while providing an enclosed blade, provides awkward access to the blade, utilizes needless tube clamping devices, and does not address the measurement issue. U.S. Pat. No. 5,203,083 to Domonoske (1993) also fails to address the need of a built in measuring device, and does not provide for the application of force necessary to shear more resilient materials.

With respect to these two previous inventions, while possibly eliminating the safety issues of the current measuring and cutting practice, they do not simplify the operation or provide an effective way of measuring the tubing being cut. The measurement process, being the most awkward and cumbersome part of the current measuring and cutting process, has been ignored.

Aside from the obvious shortcomings of the previous inventions, not exclusively a lack of measuring capabilities, their intended functionality is impaired due to the following mechanical disadvantages:

(a) Domonoske's and Crum's inventions are lacking any type of measuring device.

(b) Crum claims safer and quicker access to the blade of his invention than is provided in other cutters that utilize a spring-loaded blade. However, his claim that external access to the blade, provided by his invention, is superior to cutting devices that do not provide such access, is arguable. He does not consider alternative means of decompressing the spring or springs prior to disassembly, nor does his invention foresee alternative and simpler means to do so. In practice, Crums' device is actually more time consuming and awkward to use than other devices which do not have external access to the blade.

(c) Crum's use of external clamping devices is indeed novel, however, in practice the clamps do not support the material at the cutoff point and therefor do nothing to enhance the quality of the cut. The current process of measuring and cutting pliable tubing and cordage is neither simplified nor made less time consuming by the use of Crums' device.

(d) Crum further proposes forced air ejection of scrap material, inevitably invoking further safety precautions by the operator, such as eye protection.

(e) Domonoske's invention in actual practice provides no leverage to apply the needed force necessary to shear or even penetrate a resilient tubing. Lacking other means of actuating the cutting blade other than the force of an operators single finger, this device is awkward and difficult to use. While providing for a partially enclosed blade thereby eliminating some, but not all of, the exposed blade danger, the current process of measuring and cutting pliable tubing and cordage is neither simplified nor made less time consuming by this device.

OBJECTS AND ADVANTAGES

Accordingly, the following advantages and objects of the present invention are:

(a) to provide a hand-held cutting device incorporating an attached measuring device;

(b) to provide a hand-held cutting device with simplified access to internal mechanisms including a method or means to release spring tension prior to disassembly thereby facilitating safe blade changing;

(c) to provide a hand-held cutting device wherein extraneous clamping devices are not required, and further provide internal support precisely at the cut-off point through critical proximity of existing elements, thereby negating the need of a separate support entity or clamp;

(d) to provide a hand-held cutting device with safe and quick scrap ejection, and the facility to quickly and safely unclog the ejection device should the need arise;

(e) to provide a hand-held cutting device with an entirely enclosed blade, and ergonomic controls capable of facilitating comfortable operation, not exclusively, application of required force. The overall form and function thereby simplifying the current practice of measuring and cutting pliable tubing and reducing the time spent engaged therein.

Further objects and advantages will become apparent from a consideration of the ensuing description and drawings.

DRAWING FIGURES

In the drawings, closely related figures have the same number but different alphabetic suffixes.

REFERENCE NUMERALS IN DRAWINGS

Figure 1:
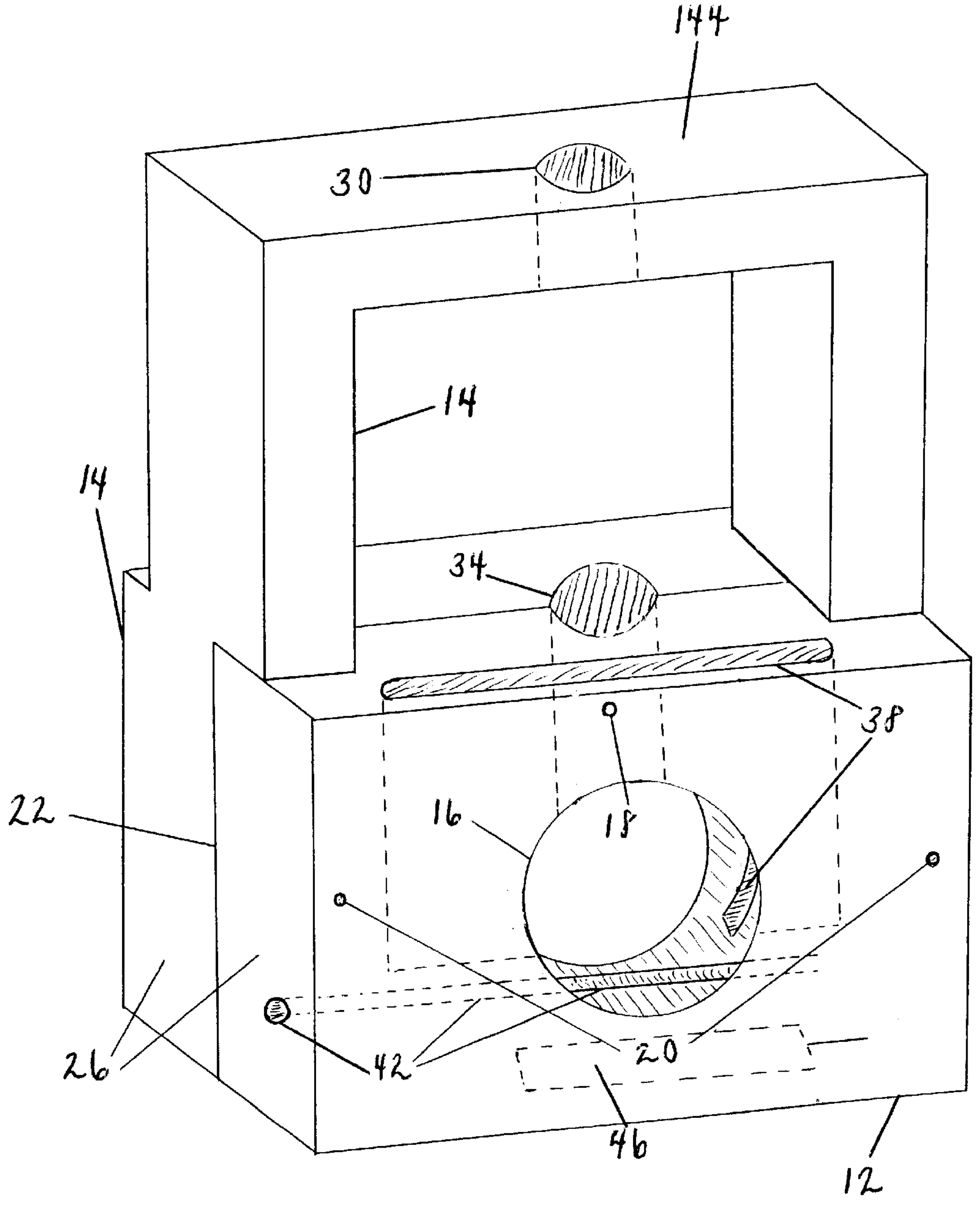
FIG. 1 is a perspective view of the present invention devoid of moving parts, illustrating the machined or formed holes and channels that accommodate the moving parts attached thereto.

12 forward substrate
14 rear handle substrate
16 material feed hole
18 retaining pin hole
20 threaded holes
22 substrate mating area
26 mounting face
28 retaining pin
30 upper plunger guide hole
34 lower plunger guide hole
38 compressor member channel
42 actuator arbor bore
46 waste ejection port
50 blade plunger
54 actuator arbor
58 compressor roller
62 compressor member
66 conventional linear measuring counter
70 blade recess
78 blade guide channel
82 compression spring retaining bore
84 ejection port surface
86 blade compression spring
90 compression spring retaining bolt
94 cutting blade
98 blade guide
102 blade spring landing
106 plunger attachment point
110 compressor member spring
114 grasping area
118 compressor member spring landing
122 compressor member cutout
126 roller retaining pin
130 roller retaining pin bore
134 roller notch
138 angled blade cutting edge
142 applied force multiplying lever
144 handle section

SUMMARY

The present invention provides a hand-held measuring and cutting device for pliable materials such as rubber tubing, nylon cordage, etcetera, typically supplied in bulk quantities in large rolls. It is an object and advantage of the present invention to simplify the current practice of measuring and cutting these bulk supplied materials. It is a further object and advantage of the present invention to provide a measuring and cutting device that is operated single-handed and provides a single tool for both measuring and cutting pliable materials, thereby reducing the time spent in this current practice, and further providing a safe, and simple means to do so.

Description—FIGS. 1 to 6

The preferred embodiment of the present invention is illustrated in FIGS. 1 to 5. FIG. 6 is a representation of an alternative but by no way limiting embodiment.

FIG. 1 is a perspective view of my measuring and cutting device comprising a forward substrate 12 and rear handle substrate 14. For clarity, FIG. 1 is shown with no associated moving parts or attachments thereto, to better illustrate the machined or formed holes and channels present in the substrates that accommodate the variety of moving parts and attachments further illustrated in FIG. 1A. Thus, a material feed hole 16 intersects perpendicular to the longitudinal axis of substrates 12 and 14. An upper plunger guide hole 30 drilled or formed in a handle section 144 of substrate 14, axially aligns with a lower plunger guide hole 34 formed at a substrate mating area 22. Guide hole 30 and 34 axially aligned, intersect vertically perpendicular to the longitudinal axis of hole 16. An actuator arbor bore 42, formed or drilled in substrate 12, is perpendicular to the plane of a mounting face 26 and intersects hole 16 at a point perpendicular to the vertical axis of a compressor member channel 38. Channel 38 machined or formed parallel to the vertical axis of substrate 12 aligns further to the vertical axis of a waste ejection port 46. Two threaded holes 20 that allow for attachment of substrate 12 to substrate 14 via quick turn or standard pitch screws (conventional, not pictured) and a retaining pin hole 18 are drilled or formed perpendicular to the longitudinal axis of the substrates 12 and 14.

Figure 1A:
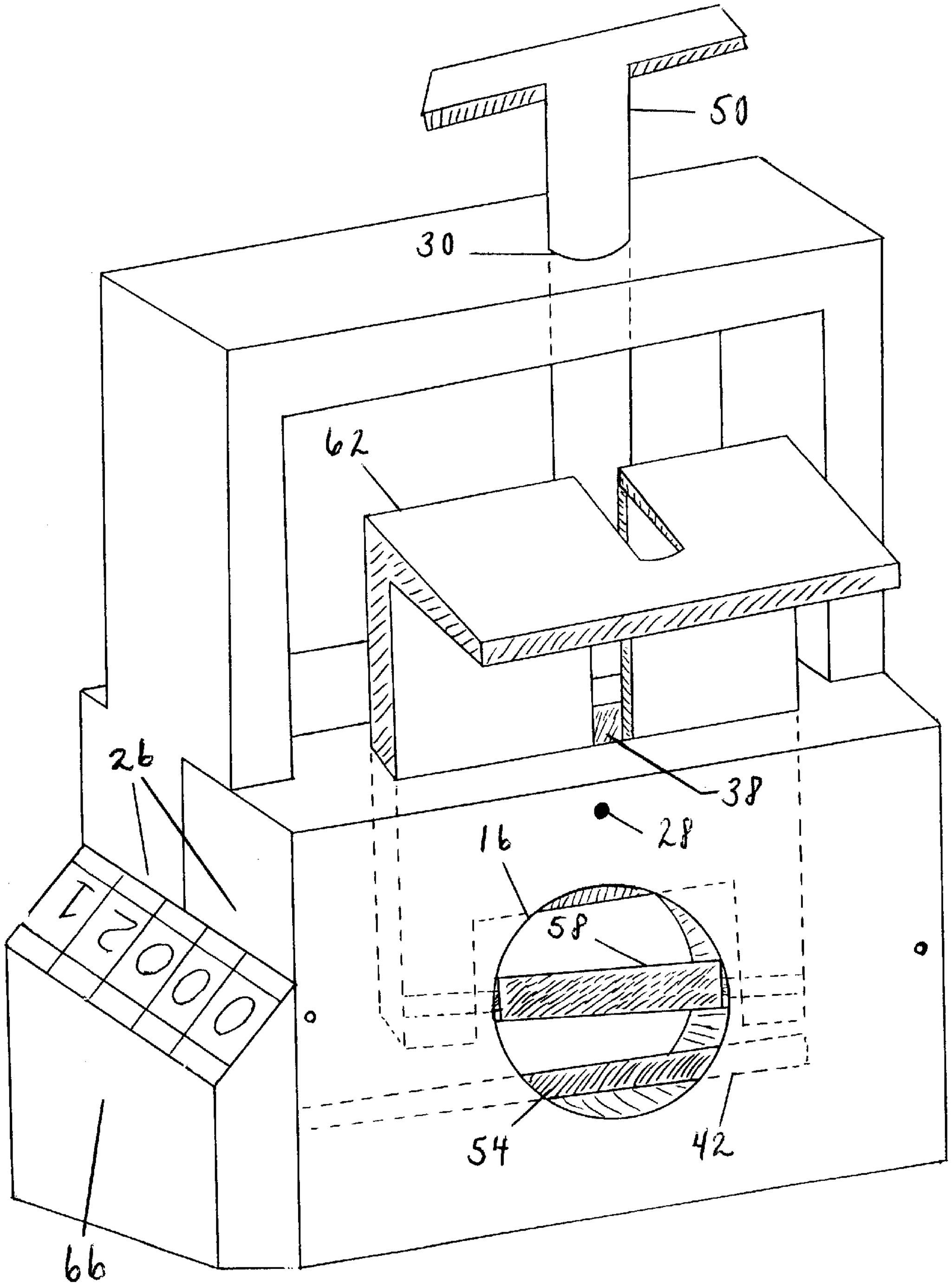
FIG. 1A is a perspective view of the present invention incorporating the associated moving parts absent from FIG. 1.

FIG. 1A is a perspective view of my measuring and cutting device illustrating the associated moving parts and attachments absent from FIG. 1. A conventional linear measuring counter 66 electrical or mechanical in nature is affixed to face 26. An actuator arbor 54 inserted in bore 42 is partially exposed in hole 16 and connects to counter 66. A compressor member 62 machined or formed is slidably mounted in channel 38. A compressor roller 58 is mounted in a roller notch 134 (FIGS. 4 and 4A) of member 62. A blade plunger 50 is slidably mounted in holes 30 and 34.

Figure 2:
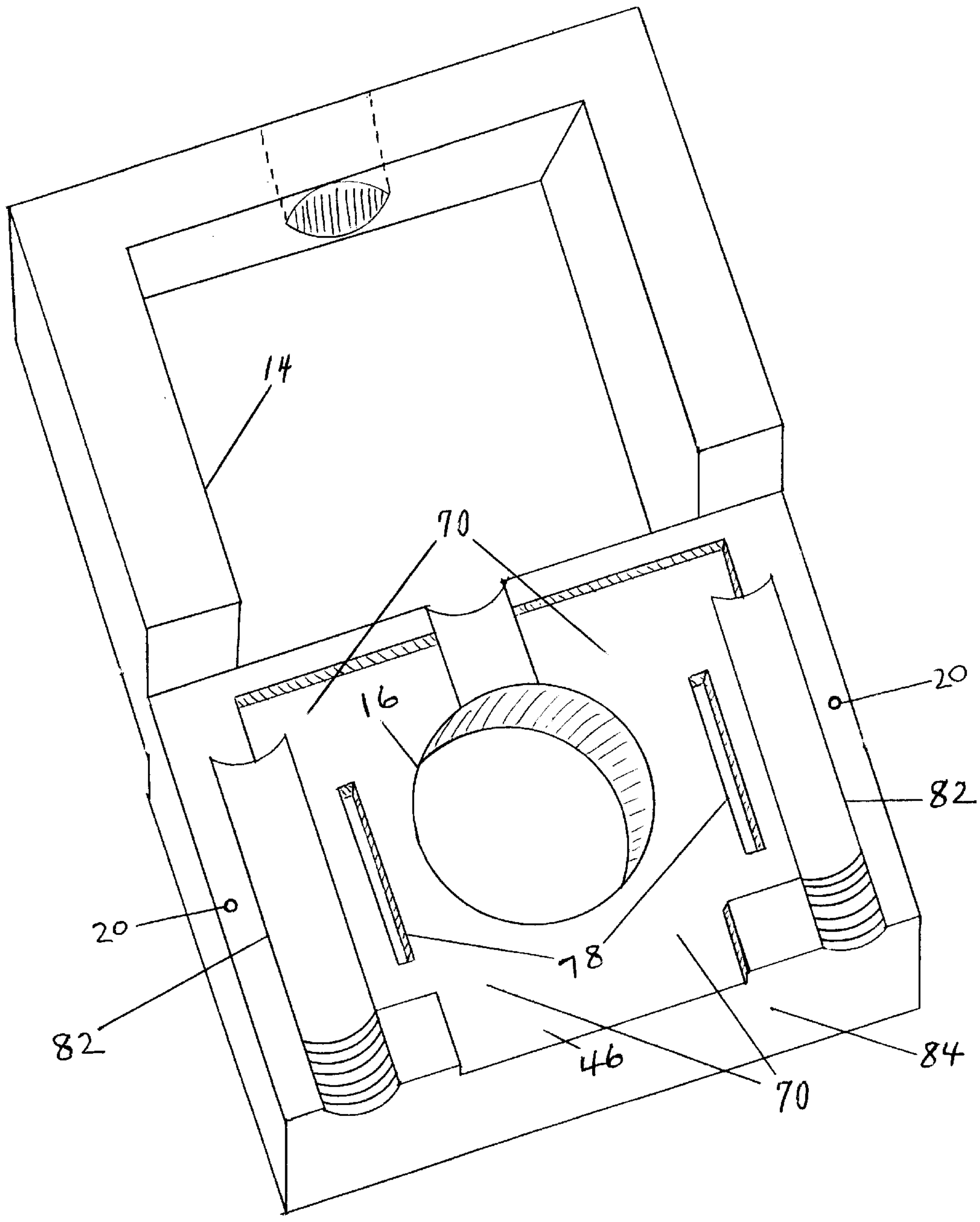
FIG. 2 is a perspective view of the rear handle substrate disconnected from the forward substrate and devoid of moving parts.
Figure 2A:
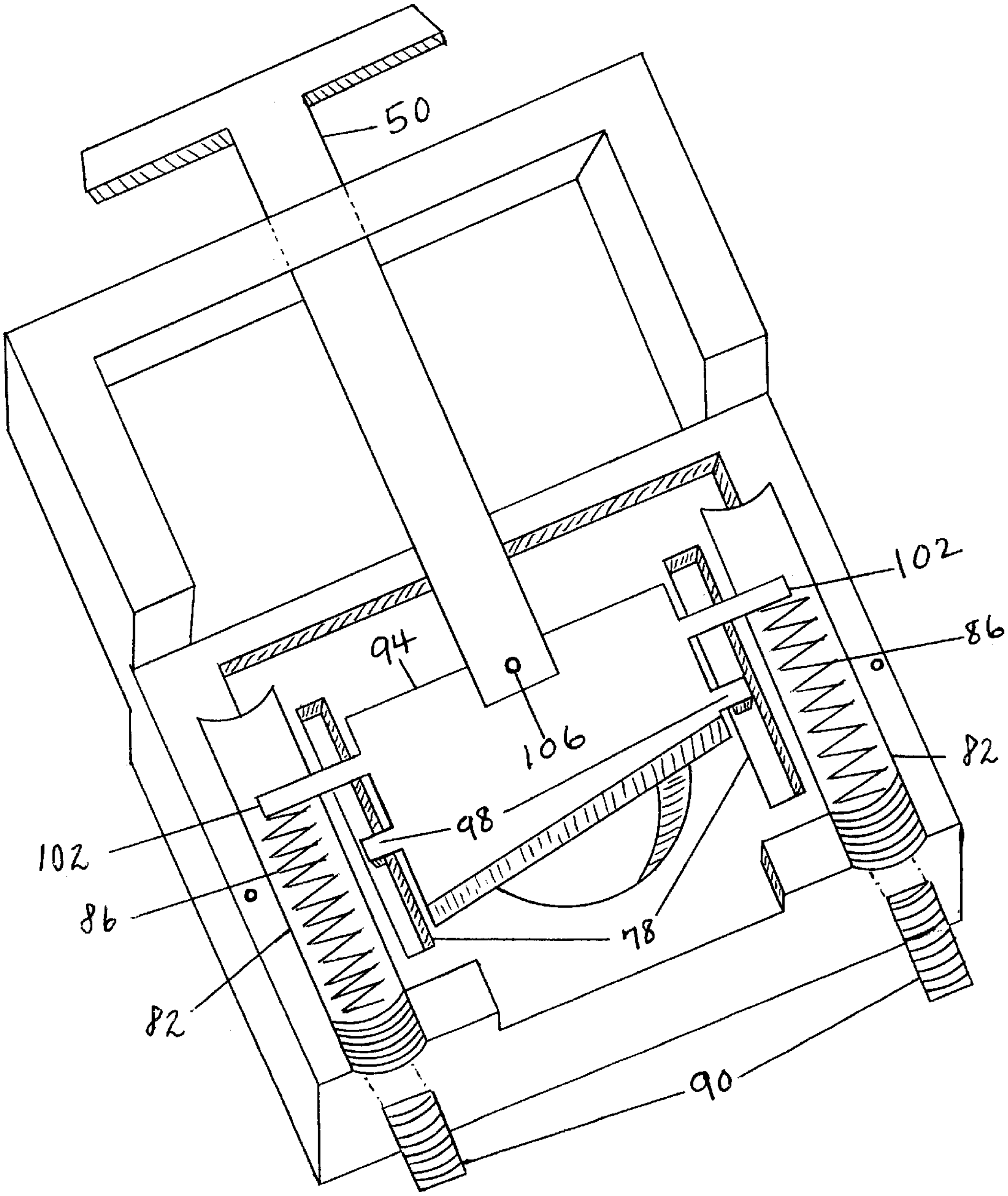
FIG. 2A is a perspective view of the rear handle substrate incorporating the associated moving parts absent from FIG. 2.

FIG. 2 is a perspective view of the internal surface of the rear handle substrate 14. For clarity, all associated moving parts and attachments are omitted to better illustrate the machined, formed or drilled channels, recesses and holes that accommodate the variety of moving parts and attachments further illustrated in FIG. 2A. Thus, in FIG. 2, a blade recess 70 is machined or formed to approximately half the thickness of a cutting blade 94 (FIG. 2A). The blade recess 70, or path, so formed, encompasses an area to include the waste ejection port 46. The recess 70 and port 46 terminate upon an ejection port surface 84. A pair of blade guide channels 78 formed or machined parallel to each other and aligned to the vertical axis of substrate 14 are disposed at opposite sides of hole 16. Two partially threaded compression spring retaining bores 82 are drilled or formed parallel to each other and further aligned to the vertical axis of substrate 14.

FIG. 2A is a perspective view of my measuring and cutting device illustrating the associated moving parts, etcetera, absent from FIG. 2. The blade 94 is mounted to the plunger 50 at plunger attachment point 106. Two blade spring landings 102 contact respective blade compression springs 86. Two compression spring retaining bolts 90 contact respective springs 86 in respective bores 82. Two blade guides 98 are slidably disposed in channels 78.

Figure 3:
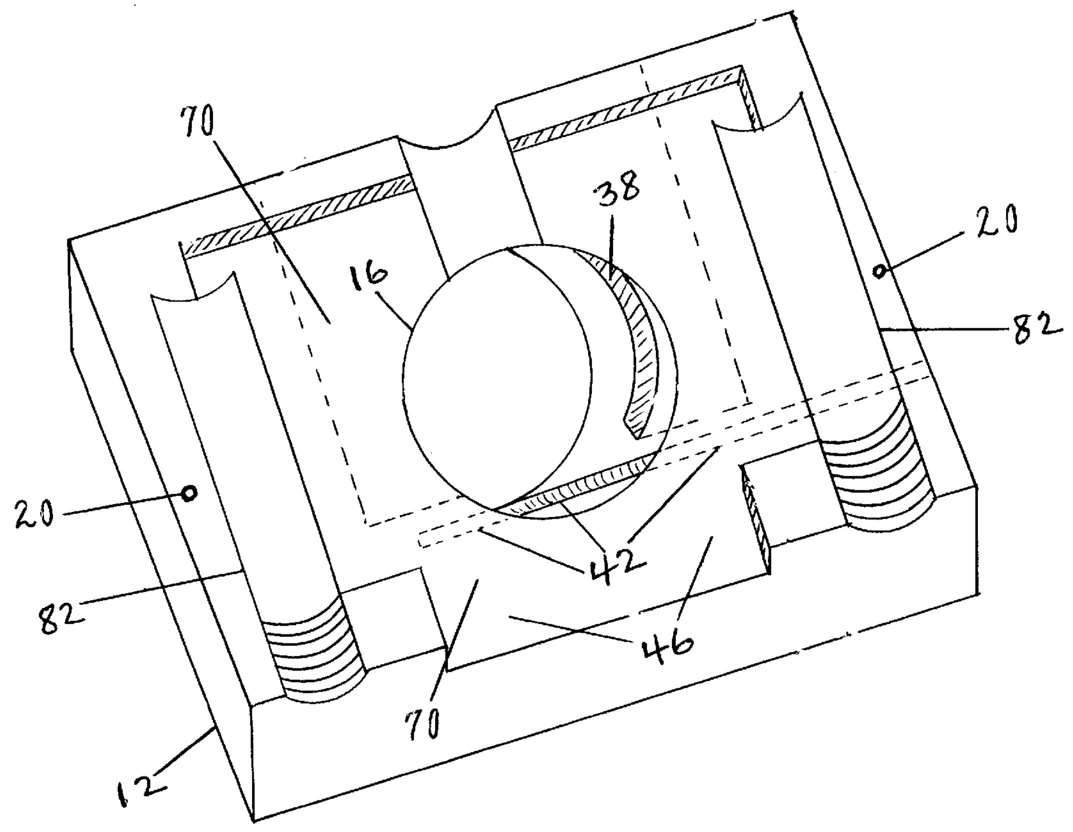
FIG. 3 is a perspective view of the forward substrate disconnected from the rear handle substrate and devoid of moving parts.

FIG. 3 is a perspective view of the internal surface of the forward substrate. Associated moving parts and attachments are further illustrated in FIG. 3A. Thus, in FIG. 3, two spring bores 82 are machined or formed parallel to each other and align to the vertical axis of substrate 12. Channel 38 intersects perpendicular to the longitudinal axis of hole 16 and parallel to the longitudinal axis of bore 42. Blade recess 70, port 46, and their associated depth and area of coverage, are mirrored and identical to the implementation of those areas depicted in FIG. 2, and the description of those implementations as stated in the description of FIG. 2 above. With respect to recess 70 and port 46, further elaborative descriptions are detailed in the operation section below.

Figure 3A:
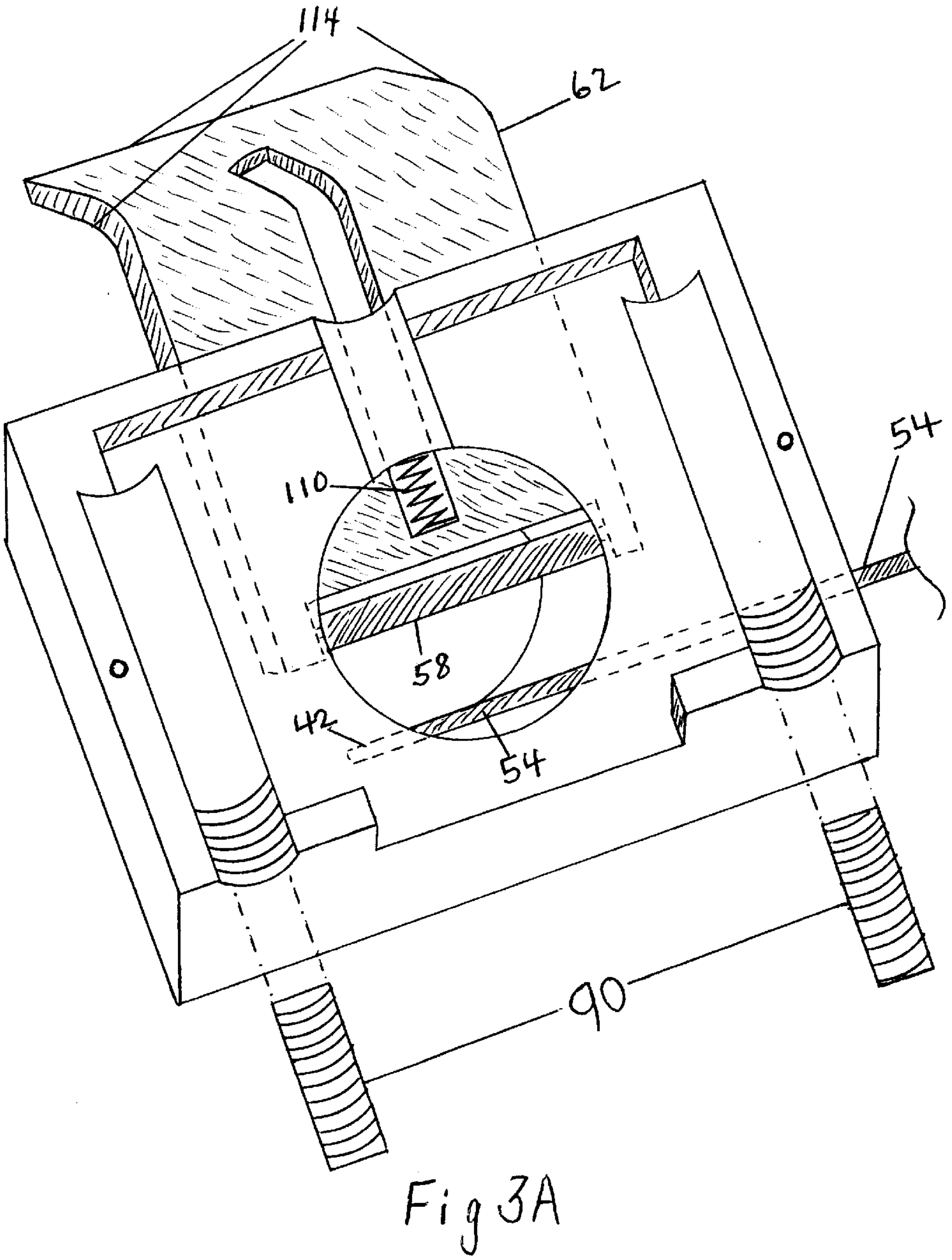
FIG. 3A is a perspective view of the forward substrate incorporating the associated moving parts absent from FIG. 3.

FIG. 3A incorporates the associated moving parts etcetera, omitted from FIG. 3. Arbor 54 is situated within bore 42. Member 62 is slidably mounted in channel 38. A grasping area 114 in member 62 is evident. Roller 58 is attached within the notch 134 (FIGS. 4 and 4A) of member 62, parallel to arbor 54. A compressor member spring 110 is positioned between a compressor member spring landing 118 (FIGS. 4 and 4A) and a retaining pin 28 situated within hole 18 (FIG. 1A).

Figure 4:
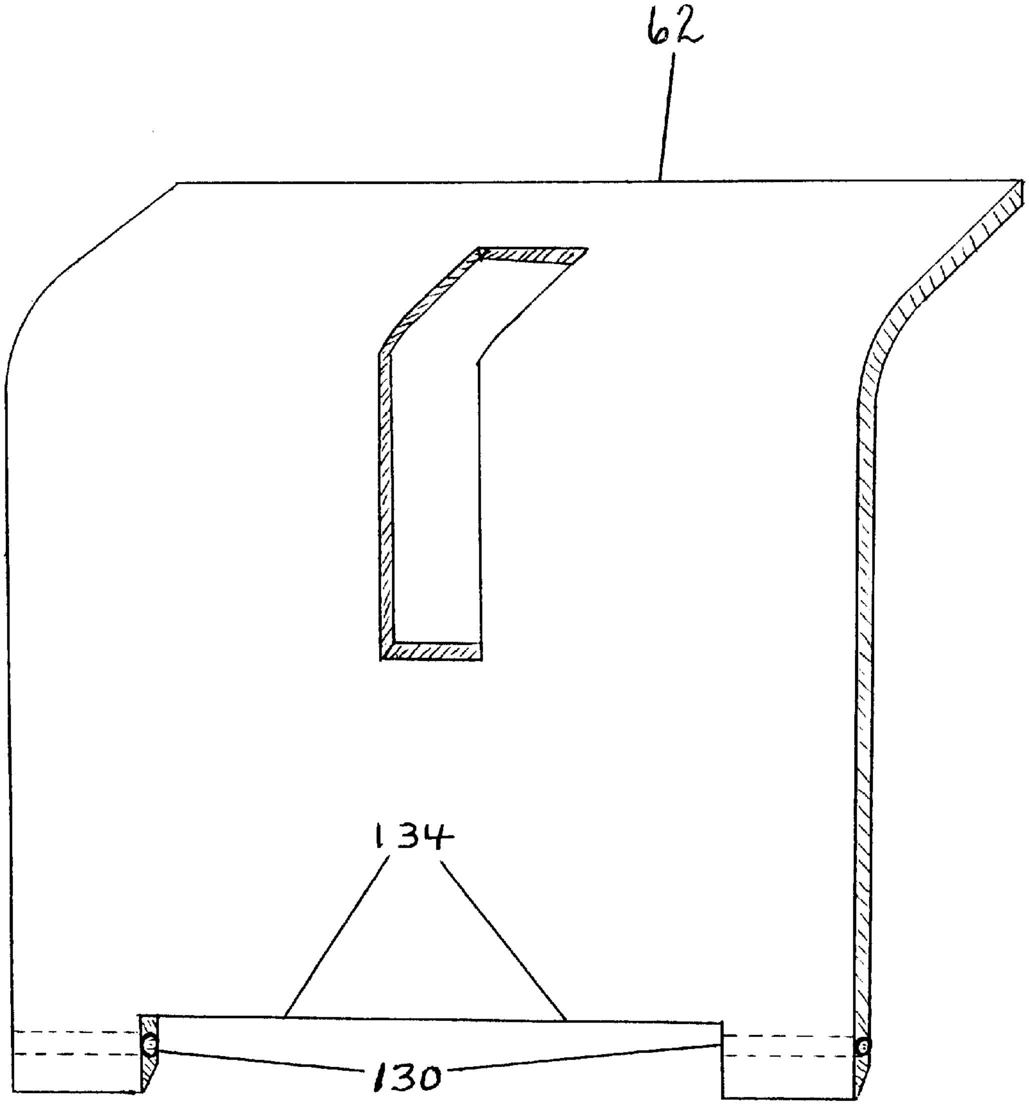
FIG. 4 is a perspective view of the compressor member devoid of moving parts.

FIG. 4 is a perspective view of member 62 devoid of moving parts and attachments to better illustrate notch 134 and roller retaining pin bores 130.

Figure 4A:
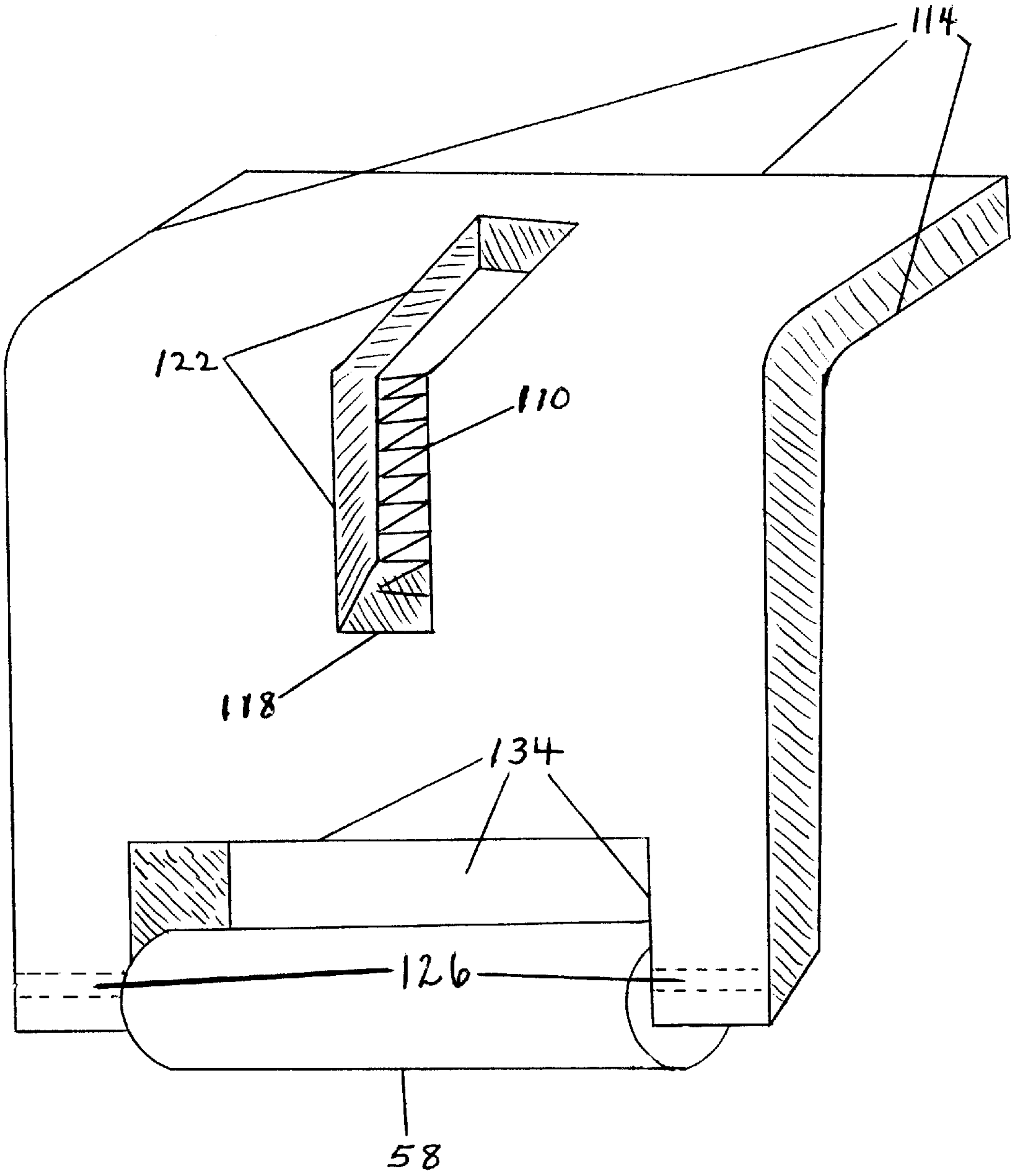
FIG. 4A is a perspective view of the compressor member incorporating the associated moving parts absent from FIG. 4.

FIG. 4A incorporates the associated moving parts etcetera, absent from FIG. 4. Roller 58 is mounted in notch 134 by a roller retaining pin 126 mounted through pin bores 130 (FIG. 4). Spring 110 is situated on its respective landing 118 within a compressor member cutout 122.

Figure 5:
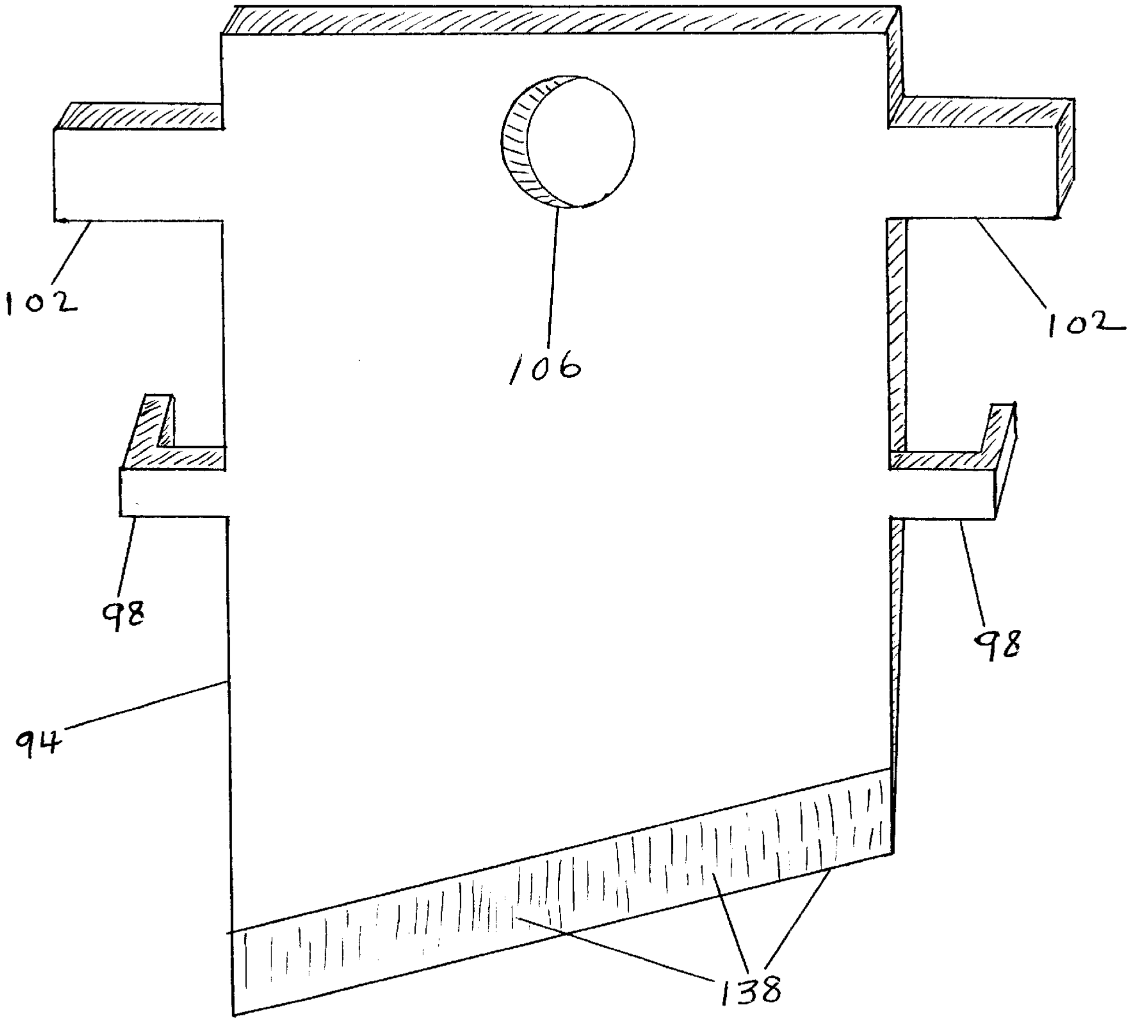
FIG. 5 is a perspective view of the cutting blade.
Figure 6:
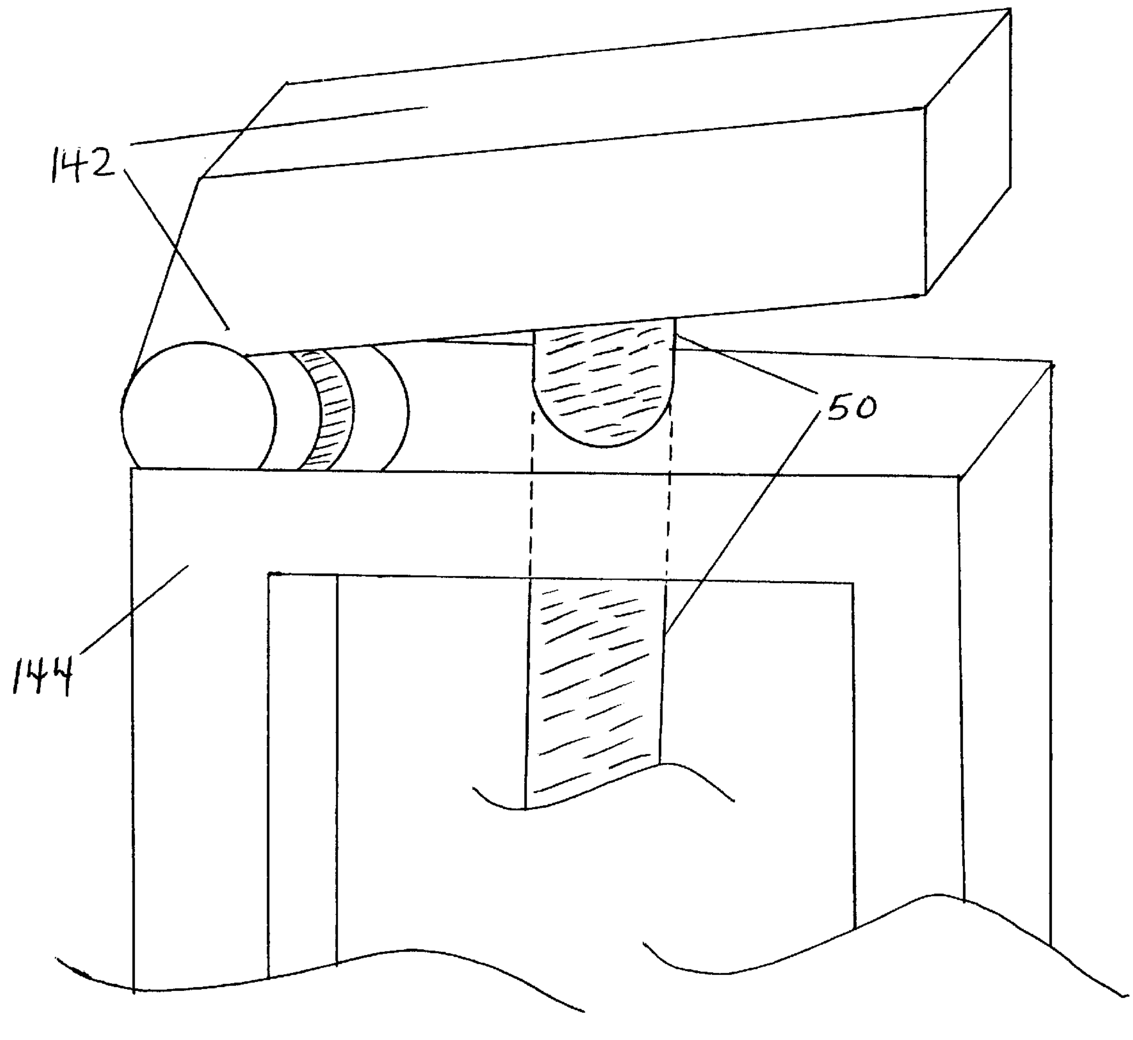
FIG. 6 is a perspective view of an alternative embodiment of the handle substrate and plunger.

FIG. 5 is a perspective view of blade 94 and serves to better illustrate the associated accoutrements machined or formed thereon. Landings 102 and guides 98 as well as point 106 are stamped or formed concurrently during blade 94 manufacturing operation thereby forming a single unit comprising a plurality of elements including an angled blade cutting edge 138.

Operation—FIGS. 1 to 5

My measuring and cutting device comprising the elements as stated in the above description of FIGS. 1 to 5 is held in an operators hand by grasping the handle section 144 of the rear handle substrate 14. The relative position of handle section 144 to grasping area 114 of protruding member 62 (FIG. 1A) allows the operator to simultaneously hold section 144 and area 114 with one hand. The bight or generally protruding proclivity of the boss or flange-like curvature in member 62 that forms area 114 facilitates this secondary grasping motion. Being held in this position the palm of the operators hand is now disposed above plunger 50. From this position, member 62 is urged vertically within channel 38 counter to the opposing force of spring 110 (FIG. 3A). Pliable material such as rubber tubing or roping is now fed through hole 16. At a pre-determined starting point along the now inserted pliable material, area 114 is released. Spring 110 now exerting tension upon member 62 and roller 58 attached thereto, forces the pliable material against arbor 54 resting partially exposed in bore 42 and hole 16 (FIG. 1A). Linear motion is now produced as the operator draws the pliable material through hole 16 with the opposing hand, or conversely, draws the measuring and cutting device along an inserted piece of pliable material. This linear motion is transferred to arbor 54 by way of the pliable material being tightly pressed against arbor 54 by member 62 and attached roller 58. The radial motion of arbor 54 caused by the linear motion of the pliable material being drawn against it is now transferred to the counter 66. Counter 66, electrical or mechanical in nature, having been properly calibrated to a pre-determined value indicative of the corresponding radial movement of arbor 54, indicates the length of the pliable material being drawn through hole 16. When counter 66 indicates the desired length of the material being measured, the operator ceases the linear feeding motion and still grasping handle section 144, exerts a downward force against plunger 50. Plunger 50 being connected to blade 94 via point 106 (FIG. 2A) continues this downward force upon blade 94. The motion of plunger 50 as it is urged by this downward force through its guide holes 30 and 34 simultaneously urges blade 94 through its path or recess 70. The pliable material lying perpendicular to recess 70 and blade 94 is sheared or cut to size. The arbor 54 and compressor roller 58 being so proximate and engaged about the pliable material, enable or facilitate a general clamping action therein, whereby a discreet or separate clamping device is not required. Blade 94 is supported and guided through this step of the operation by the following, also evident in FIG. 2A. Guides 98 inserted in channels 78 provide side to side stabilization of the blade 94. The overlap of plunger 50 and blade 94 at point 106 provides lateral re-enforcement to blade 94 further strengthening the lateral support offered by the proximity of the surface of the blade 94 to the surface of recess 70. Plunger 50 is now released and the compressional energy stored in springs 86 (FIG. 2A) urges landings 102 in an upward motion. Plunger 50 and blade 94 being so disposed and attached to landings 102 returns plunger 50 and blade 94 to their original pre-cutting positions. Port 46 so formed and positioned beneath the cutting area allows for the ejection of scrap formed during the cutting process. Bolts 90 and bores 82 while serving to retain their respective springs 86 also provide direct adjustment of the resting length of those springs 86 which in turn alters their compressional energy storage characteristics. Bolts 90 further serve to allow safe decompressing of the springs 86 for removal prior to opening the unit for maintenance or blade changing.

And finally, with respect to hole 34 and bore 82, particularly FIGS. 2 and 3, the following elaboration is in order. Hole 34 and bores 82 are formed or machined, etcetera, at the mating area 22 generally while the two substrates are assembled to each other. Therefore, when substrates 12 and 14 are disassembled only half the hole 34 or bore 82 is present in either side. For clarity in the operation section above, each half hole or bore was referenced in the description and accompanying drawings as though it were the entire hole or bore that exists only when the two substrates are assembled to each other. In like fashion, recess 70 and port 46, depicted in both substrates, are reciprocal halves to their respective and like numbered composite whole.

Alternative Embodiment—FIG. 6

FIG. 6 is a perspective view of the handle section 144 of the above invention. An alternative embodiment or modification would comprise an applied force multiplying lever 142 pivotably mounted to the handle section 144 and engaging a correspondingly modified plunger 50. Resultant fulcrum and lever type operation would increase the applied cutting power. Resilient or tougher materials could be cut with greater comfort to the operator.

Conclusions, Ramifications, and Scope

Accordingly, the reader will see that the hand-held measurer and cutter of this invention will simplify the current practice of measuring and cutting pliable materials. In addition to being quickly and safely operated, the measurer and cutter invention presented here provides additional advantages in that

- it provides for single handed measuring and cutting;
- it provides quick and safe disassembly for maintenance or blade changing;
- it provides a single tool for the purpose of measuring and cutting a wide variety of pliable materials including rubber tubing, nylon cordage and roping;

it provides a time saving, safe, and organized way to cut pliable materials.

Although the description above contains many specificities, these should not be construed as limiting the scope of the invention but as merely providing illustrations of some of the presently preferred embodiments of this invention. For example, the conventional counter could conceivably be mounted directly to the compressor member, or the roller of the compressor member could provide the means of activation for an electrical conventional counter. The conventional counter if electrical in nature could conceivably have activating sensors located and triggered by actions other than radial motion. The conventional counter if mechanical in nature could conceivably be mounted elsewhere about the device and actuated by actions other than linear motion. The forward and rear substrates could be joined together by means other than screws. For example, only one screw or bolt could be strategically placed and still yield the joining power of two screws. An external male and female snap-fit, or any of dozens of conventional joining methods could be utilized and still not stray from the scope of the present preferred embodiment. The feed hole could conceivably be replaced by an area other than a hole. And finally, with respect to the substrates, although two rigid substrates are demountably affixed to each other, the two substrates could conceivably be permanently affixed to each other thereby rendering a single or one piece substrate. Furthermore, with respect to the utility provided by either substrate, it is conceivable that one substrate could be replaced entirely by discreet components that provide the utility of the unique grooves, channels, and holes etcetera, present in either substrate. For example, the utility of the plunger guide holes present in either substrate could be replaced by discreet straps or supports attached to the remaining substrate thereby eliminating one entire substrate, but not simplifying the present invention, or depreciating its scope.

Thus the scope of the invention should be determined by the appended claims and their legal equivalents, rather than by the examples given.

I claim:

1. A hand held measuring and cutting device for pliable tubing, comprising:

a vertically elongated frame with a horizontal feed hole to accommodate a length of tubing, said frame further having vertically oriented guides with a reciprocating cutting blade mounted therein, said having a handle for actuation thereof and said guides having spring return devices therein, and a vertical slot with a reciprocating compressor member for applying force to the tubing, the device also being equipped with a counter that has a sensor for measuring the length of tubing that is drawn through the device.

2. The hand held measuring and cutting device of claim 1, wherein said compressor has a lower roller for contacting and compressing the tubing.

3. The hand held measuring and cutting device of claim 1, wherein a rotating arbor is mounted in the lower portion of the frame and protrudes into said feed hole, said arbor being connected to said counter for actuating said counter when a length of tubing is drawn thought said feed hole.

4. The hand held measuring and cutting device of claim 1, wherein said reciprocating cutting blade handle is pivotally coupled to said reciprocating blade to multiply the force applied thereto.

* * * * *

UNITED STATES PATENT AND TRADEMARK OFFICE

CERTIFICATE OF CORRECTION

PATENT NO. : 6,546,630 B2
DATED : April 15, 2003
INVENTOR(S) : Francis J. Davidson It is certified that error appears in the above-identified patent and that said Letters Patent is hereby corrected as shown below:

Column 8,
Line 14, change "said having a handle for" to -- said blade having a handle for --
Line 28, change "is drawn thought" to -- is drawn through --

Signed and Sealed this

Twelfth Day of August, 2003

JAMES E. ROGAN
*Director of the United States Patent and Trademark Office*